United States Patent [19]
Guile et al.

[11] Patent Number: 5,603,216
[45] Date of Patent: Feb. 18, 1997

[54] BY-PASS ADSORBER SYSTEM

[75] Inventors: Donald L. Guile, Horseheads; Thomas D. Ketcham, Big Flats, both of N.Y.

[73] Assignee: Corning Incorporated, Corning, N.Y.

[21] Appl. No.: 375,699

[22] Filed: Jan. 19, 1995

Related U.S. Application Data

[63] Continuation-in-part of Ser. No. 284,356, Aug. 2, 1994, abandoned.

[51] Int. Cl.$^6$ ................................................. F01N 3/28
[52] U.S. Cl. ................................................. 60/288; 60/297
[58] Field of Search ............................ 60/274, 288, 297

[56] References Cited

U.S. PATENT DOCUMENTS

| | | |
|---|---|---|
| 3,702,866 | 11/1972 | Argauer et al. . |
| 3,709,979 | 1/1973 | Chu . |
| 3,832,449 | 8/1974 | Rosinski et al. . |
| 4,196,170 | 4/1980 | Cemenska . |
| 4,625,511 | 12/1986 | Scheitlin et al. . |
| 5,089,236 | 2/1992 | Clerc . |
| 5,125,231 | 6/1992 | Patil et al. ............................ 60/297 |
| 5,144,796 | 9/1992 | Swars . |
| 5,211,012 | 5/1993 | Swars . |
| 5,271,906 | 12/1993 | Yuuki et al. . |
| 5,315,824 | 5/1994 | Takeshima . |
| 5,373,696 | 12/1994 | Adamczyk ............................ 60/297 |

FOREIGN PATENT DOCUMENTS

| | | |
|---|---|---|
| 0580931A1 | 2/1994 | European Pat. Off. . |
| 1275772 | 5/1972 | United Kingdom ................ 60/288 |
| 1334243 | 10/1973 | United Kingdom . |
| 2240486 | 8/1991 | United Kingdom . |
| 2254014 | 9/1992 | United Kingdom . |

*Primary Examiner*—Douglas Hart
*Attorney, Agent, or Firm*—Timothy M. Schaeberle

[57] ABSTRACT

A engine exhaust system is disclosed for reducing the amount of hydrocarbons emitted during engine start-up (cold-start), before the catalytic converter has attained its effective operating temperature. The system includes a flow diverter, in particular a secondary air jet adapted to direct substantially all of the engine exhaust through a molecular sieve structure during cold-start, and to direct the engine exhaust stream directly from the light-off catalyst to the burnoff catalyst, bypassing the molecular sieve structure after light-off.

22 Claims, 4 Drawing Sheets

BY-PASS ADSORBER SYSTEM

BACKGROUND OF THE INVENTION

This is a continuation-in-part application of U.S. Ser. No. 08/284,356, filed Aug. 2, 1994 and now abandoned.

The present invention relates to a by-pass adsorber system capable of meeting the ultra-low emission vehicle (ULEV) standards by utilizing a combination of light-off catalyst, electrically heated catalyst, a burn-off catalyst, a hydrocarbon adsorber, exhaust stream diverter and optionally, a three-way catalyst as a main converter.

Internal combustion engines emit large amounts of unburned hydrocarbons during the cold start of an engine due to the rich fuel mixture used in such engines, and the necessarily incomplete combustion at start-up. This emission of unburned hydrocarbons continues until the main catalyst reaches its "light-off" temperature, at which point the catalyst begins to convert the hydrocarbons to harmless gases. It has been determined that the typical light-off times for most internal combustion engines are around 50 to 120 seconds, during which time significant amounts of hydrocarbons are emitted into the atmosphere. The actual light-off time for any system will depend on the position of the catalyst relative to the engine, as well as the noble metal loading.

While catalytic converters are well known for reducing oxides of nitrogen (NOx), and oxidizing hydrocarbons and carbon monoxide from automobile exhaust, these reactions typically take place at temperatures of 300° C. or higher. However, to increase the effectiveness of automotive emission control systems, at much lower temperature, that is, during cold start, a significant amount of hydrocarbons must be adsorbed and held until the converter attains its light-off temperature.

In the past, attempts have been made to improve efficiency using complex and expensive valving systems, or by using multiple catalysts placed in series along the exhaust stream path. Others have attempted to deal with the above problems by splitting the exhaust stream into equal portions which are directed to different converters or filters. Still, others have disclosed a multiple catalytic converter system in which flow of the exhaust gas is controlled to each converter using a pressure sensitive flow control valve. A system has also been disclosed in which the amount of hydrocarbons entrained in exhaust gas is reduced at low temperatures and during low engine load conditions by passing the exhaust gas through a catalytic bed of sufficient volume having low space velocities to ensure that the exhaust gas remains in contact with the catalyst bed for a predetermined period of time to ensure adequate conversion. At high engine temperatures and high engine loads, the gas is passed through a small volume catalytic converter of high space velocities to allow only minimal contact with catalyst bed. The control mechanism for directing the exhaust gas flow includes a valve and an electronic control system for controlling the valve. None of the above systems provide for purification by adsorbing and desorbing the hydrocarbons at appropriate intervals.

Several methods have been proposed for trapping or removing these unburned hydrocarbons, including zeolite traps, carbon traps and electrically heated catalysts. For example, a system has been disclosed which includes a hydrocarbon adsorbing material made up of a substrate coated with mixed powders of ZSM-5 zeolite ion-exchanged with Cu and Pd, and placed inline and upstream from a Pt/Rh catalyst.

Recently, co-pending, co-assigned application Ser. No. 08/106,512 and 08/106,514 have disclosed novel approaches for improving the capacity of zeolites to adsorb a broad range of hydrocarbons using modified zeolites. For the most part, many of the above systems rely on complex valving systems for exhaust gas flow. Since the effectiveness of the catalytic converter, at least with respect to hydrocarbon conversion varies with engine operating conditions such as temperature and engine speed, there continues to be a need for engine exhaust systems which are capable to adjusting effectiveness based on prevailing engine operating conditions.

More recently, co-pending, co-assigned, U.S. application Ser. No. 08/234,680 and 08/259,459 have disclosed improved in-line and by-pass adsorption systems respectively, using bi-metallic valves which control the flow of exhaust gases to the adsorber during cold-start. Co-pending, co-assigned U.S. application Ser. No. 08/284,360, filed concurrently herewith, discloses an in-line adsorber system in which flow patterns from a secondary air source are used to direct exhaust gases to the adsorber during cold start.

There continues to be a need for new and improved hydrocarbon adsorption systems capable of meeting the ULEV standards. Accordingly, it is the object of the present invention to provide an improved engine exhaust system for reducing or removing unburned hydrocarbons from exhaust emissions, particularly during cold-start.

SUMMARY OF THE INVENTION

The invention relates to a by-pass engine exhaust system for treating hydrocarbon-containing exhaust gases. Briefly, the exhaust system includes a main catalyst or a burnoff catalyst which is connected to an engine through an exhaust pipe. In its most basic form, a by-pass housing is positionally displaced from and connected to the exhaust pipe at two junctions along the exhaust pipe and in alignment with the burn-off catalyst. The first junction connects the exhaust pipe to the inlet end of the by-pass housing while the second junction connects the exhaust pipe to the outlet end of the housing. The by-pass housing has disposed therein, a hydrocarbon adsorber (molecular sieve structure) for trapping hydrocarbons from the exhaust gas stream. A flow control device is provided preferably at the junctions, for directing and controlling the flow of exhaust stream through the adsorber during cold-start. Optionally, depending on the required application, a light-off catalyst, heater or an electrically heated catalyst (EHC), or a pre-converter can be positioned downstream from the engine and upstream from the burn-off catalyst.

In one key aspect, the invention relates a method of treating hydrocarbon-containing exhaust gases using the exhaust system of the invention. In operation, the molecular sieve structure adsorbs hydrocarbons from the engine exhaust stream at temperatures below a first temperature, and at a second temperature higher than the first temperature, the molecular sieve desorbs the hydrocarbons which are then converted to water and carbon dioxide by the burn-off catalyst under redox conditions. During cold-start, the flow control device operates to direct all or substantially all of the exhaust stream through the molecular sieve structure. After the main catalytic converter has reached its light-off temperature, the adsorber reaches its desorption temperature and thereafter desorbs any trapped hydrocarbon therefrom. At this point, the flow control device then operates to direct a major portion of the exhaust stream away from the molecular sieve structure, thereby effectively directing most of the exhaust stream to the main catalyst, either directly or through an optional light-off catalyst.

As used in this specification:

"high-silica zeolite" refers to those zeolites having a $SiO_2/Al_2O_3$ molar ratio which exceeds about 10 and for some applications, greater than 100; any silica/alumina ratio can be used in this invention, however, it is preferable to use high or very high silica/alumina ratio for thermal stability;

"molecular sieve" refers to crystalline substances or structures having pore sizes suitable for adsorbing molecules. The term is generally used to describe a class of materials that exhibit selective absorptions properties. To be a molecular sieve, the material must separate components of a mixture on the basis of molecular size and shape differences. Such materials include silicates, the metallosilicates, metalloaluminates, the $AlPO_4$s, silico- and metalloaluminophosphates, zeolites and others described in R. Szostak, *Molecular Sieves: Principles of Synthesis and Identification*, pages 2–6 (Van Nostrand Reinhold Catalysis Series, 1989); as more specifically used herein, the molecular sieve structure is a hydrocarbon adsorber, preferably a zeolite which, at low temperatures, adsorbs and "holds" hydrocarbon emissions generated during start-up of the engine (cold-start), and desorbs these hydrocarbons when the molecular sieve attains its desorption temperature.

"zeolites" are crystalline aluminosilicates whose structures are based on a theoretically limitless three-dimensional network of $AlO_x$ and $SiO_y$ tetrahedra linked by the sharing of oxygen atoms, such as more fully disclosed in U.S. Pat. No. 3,702,886, in British Specification No. 1,334,243, published Oct. 17, 1973, in U.S. Pat. No. 3,709,979, and in U.S. Pat. No. 3,832,449, all of which are herein incorporated by reference;

"light-off temperature" of a converter is the temperature at which a catalytic converter can convert 50% of carbon monoxide or hydrocarbons or NOx;

"monolithic substrate" is any unitary body or substrate formed from, or incorporating molecular sieve material; as used herein, a honeycomb substrate is a form of a monolithic substrate, but a monolithic substrate is not necessarily a honeycomb substrate;

oxidation of desorbed hydrocarbons takes place in the "burn-off" catalyst which can also function as a three-way catalyst to convert oxides of nitrogen (NOx), and carbon monoxide, in addition to hydrocarbons; if necessary, additional air is added to bring the redox ratio to levels needed to convert the noxious gases to harmless gases;

"fluidics" is used herein to describe the mechanism or process of diverting exhaust gas flow either to or away from the molecular sieve structure using a smaller stream of fluid; and for ease of discussion, the terms "adsorber" and "adsorption" as used herein are intended to encompass both adsorption and absorption as these terms are generally known to persons skilled in the art and as defined in *Webster's Ninth New Collegiate Dictionary* (1985); it is contemplated that both processes of adsorption and absorption occur in the molecular sieve structure of the invention.

Reference Numerals in the Drawings 12, 12' . . . by-pass housing;
13, 13' . . . upstream junction connecting the inlet end of the by-pass housing to the exhaust pipe;
15, 15' . . . downstream junction connecting the outlet end of the by-pass housing to the exhaust pipe;
14, 14', 14" . . . adsorber;
17, 24, 28, 30 . . . optional light-off catalyst, EHC, or pre-converter;
20 . . . burn-off catalyst;
25 . . . exhaust pipe;
26, 27, 29, 33, 35, 36, 38, 63, 65 . . . flow diverters;
37, 39 . . . nozzles;
31, 47, 49. flow valves;
40, 45 . . . secondary air jets;
50 . . . air injection collar;
55, 57 . . . narrow slit nozzles on a rectangular surface;
62, 64 . . . split pipes from the engine; and
67 . . . tail pipe.

DETAILED DESCRIPTION OF THE INVENTION

Typically, during cold-start, the engine exhaust temperature is too low to bring the burn-off catalyst or main catalytic converter to its light-off temperature. In the preferred embodiment, upon engine start-up hydrocarbons from the exhaust stream are adsorbed until the burn-off catalyst has attained its light-off temperature and subsequently, its effective operating temperature, at which time the hydrocarbons are then desorbed from the molecular sieve adsorber. Desorption of the hydrocarbons from the molecular sieve commences when the molecular sieve attains its desorption temperature, and desorption is generally complete by the time the molecular sieve adsorber reaches a temperature in the range of 250° to 400° C., depending on the particular molecular sieve structure. Preferably, the molecular sieve attains its desorption temperature and consequently desorbs any trapped hydrocarbons after the main catalytic converter or burn-off catalyst has reached its light off temperature or as soon thereafter as practical.

The catalysts typically utilized in automotive catalytic converters for example, generally have light-off temperatures of about 200° to 400° C. The exhaust system of the invention enables the molecular sieve, preferably zeolite to adsorb and "hold" exhaust hydrocarbons until the catalyst has reached its light-off temperature and then "release" the hydrocarbons to the burn-off catalyst for conversion. It is contemplated by the invention that, as soon after engine start-up as possible, the main catalyst attains its light-off temperature. Following light-off, the temperatures of the molecular sieve and the catalyst are raised by virtue of their contact with the hot exhaust gases emitted by the engine.

We have found that a by-pass hydrocarbon adsorber capable of meeting the ULEV standards can be achieved using fluidics to divert engine exhaust gases as described herein. Using fluidics, engine exhaust gas flow is diverted either to or away from a zeolite adsorber, a pre-converter, an electrically heated catalyst, or any combination of these, by injecting a smaller gas stream from a secondary source into the engine exhaust stream thereby changing the flow direction of the exhaust gases as more fully described below with reference to the drawings.

Figure 1:
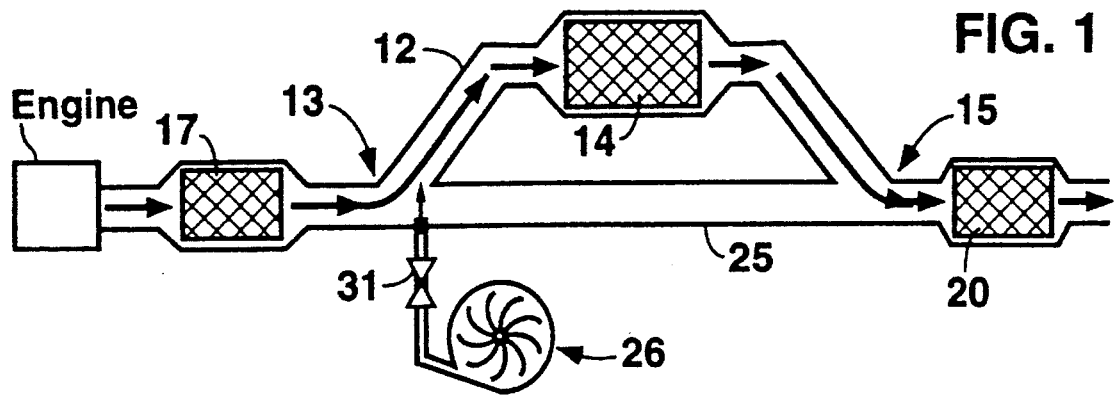
FIGS. 1 and 2 are illustrative schematic diagrams showing examples of engine exhaust/hydrocarbon adsorber systems in which the fluidic flow diverter of the invention is used to control flow of exhaust gases in a branched and Y-type exhaust system respectively.
Figure 2:
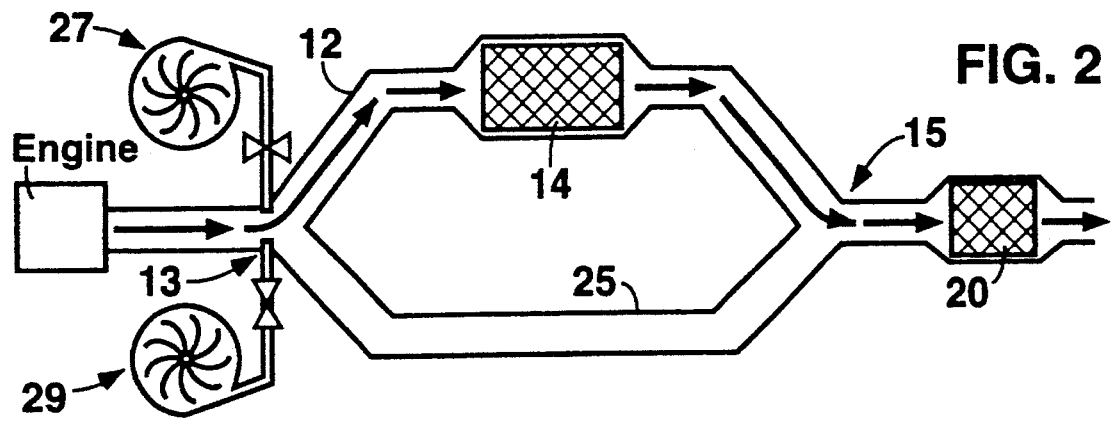

For example, during cold-start flow of secondary air jet can be used to divert all or substantially all of the engine exhaust gas stream to a zeolite adsorber for the purpose of trapping hydrocarbons. After light-off is attained, the air jet is adjusted to divert the exhaust stream away from the adsorber and through the exhaust pipe. This is achieved by projecting a jet of secondary air into the exhaust gas flow path, preferably at the first or upstream junction 13 connecting the housing to the exhaust pipe to divert the exhaust gas flow in a desired direction (FIG. 1). For ease of discussion, this segment of the exhaust system forming a direct path between the engine and the burn-off catalyst in the branch design of FIG. 1, and the pipe running parallel to the by-pass housing in FIGS. 2–6, will be referred to as "the exhaust pipe." During cold-start the flow diverter can be placed on the inlet end of the adsorber housing as shown in FIGS. 1 and 2 to direct exhaust gas flow away from the exhaust pipe 25 and into the adsorber as shown. When the burn-off catalyst has attained its light-off temperature, some amount of the exhaust gases may be allowed to continue to flow through the adsorber to aid with desorption and to raise the adsorber to its desorption temperature. During cold start, the flow diverter operates by projecting a small jet of secondary air stream from a secondary air source, through an air injection port or collar into the engine exhaust stream to divert the exhaust gas flow away from the exhaust pipe 25, and into the adsorber housing.

After the temperature has reached a predetermined level, preferably, when the burn-off catalyst has attained its effective operating temperature, the flow direction is adjusted or diverted away from the adsorber thereby effectively directing most of the exhaust gas through the exhaust pipe to the burn-off catalyst while continuing to direct a small portion of the exhaust gases to the adsorber. As the hot exhaust gas passes through the burn-off catalyst it quickly heats the catalyst and brings it to its effective light-off temperature at which it is then able to convert the hydrocarbons and other pollutants in the exhaust stream. Preferably, the amount of the exhaust gas which is allowed to continue to flow through the adsorber after light-off is an amount just sufficient to bring the adsorber to its desorption temperature as the burn-off catalyst attains its effective operating temperature or soon thereafter, and thereby effect desorption of hydrocarbons from the adsorber. The specific amount for each adsorber system will depend on the adsorber material, the size of the adsorber and other operating variable and therefore may need to be determined by experimentation. The desorbed hydrocarbons are subsequently converted at the burn-off catalyst.

The preferred embodiments of the invention will now be described with reference to FIGS. 1 to 2c. The exhaust system shown in FIG. 1 consists essentially of a main catalyst or a burnoff catalyst 20, connected to an engine through an exhaust pipe 25 which connects to a by-pass housing 12 at two junctions 13 (upstream) and 15 (downstream). A hydrocarbon adsorber 14 for trapping hydrocarbons from the engine exhaust gas stream is disposed in the by-pass housing 12. The by-pass housing 12 is positionally displaced from the exhaust pipe 25 connecting the engine to the burn-off catalyst 20 as shown. Optionally, a light-off catalyst 17 can be positioned just downstream from, and closely coupled to the engine upstream from the first junction 13 as shown.

As contemplated by the invention, flow diverting means 26 (FIG. 1), and 27,29 (FIG. 2) are provided in the region of junction 13 to divert exhaust gas flow to the by-pass housing 12 during cold start, that is before the burn-off catalyst 20 attains its effective light-off temperature. After light-off, the flow diverting means then operates to allow a substantial amount of the exhaust to pass directly to the burn-off catalyst 20 through the exhaust pipe 25. Preferably, for a period of time after light-off is attained, a sufficient amount of the exhaust gases are allowed to continue to flow through the adsorber to help bring the adsorber to its desorption temperature. After the hydrocarbons have been desorbed, exhaust gas flow through the adsorber may then be completely terminated.

Figure 2A:
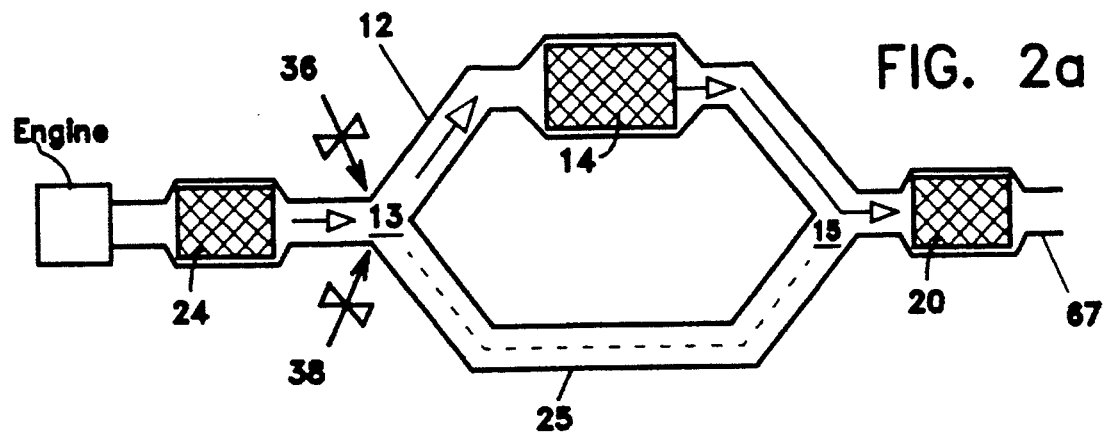
FIGS. 2a to 2c are illustrative diagrams of an embodiment of the invention having optional emission enhancement devices such as EHC or preconverter.
Figure 2B:
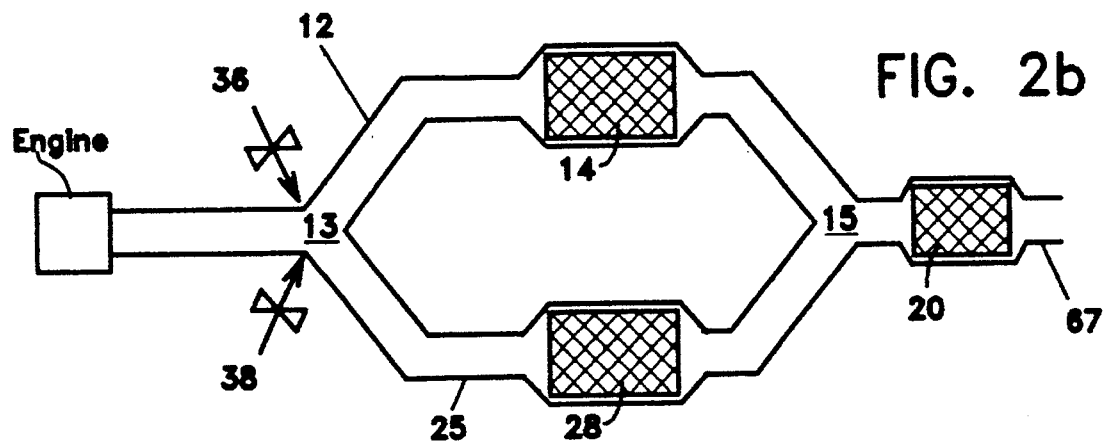
Figure 2C:
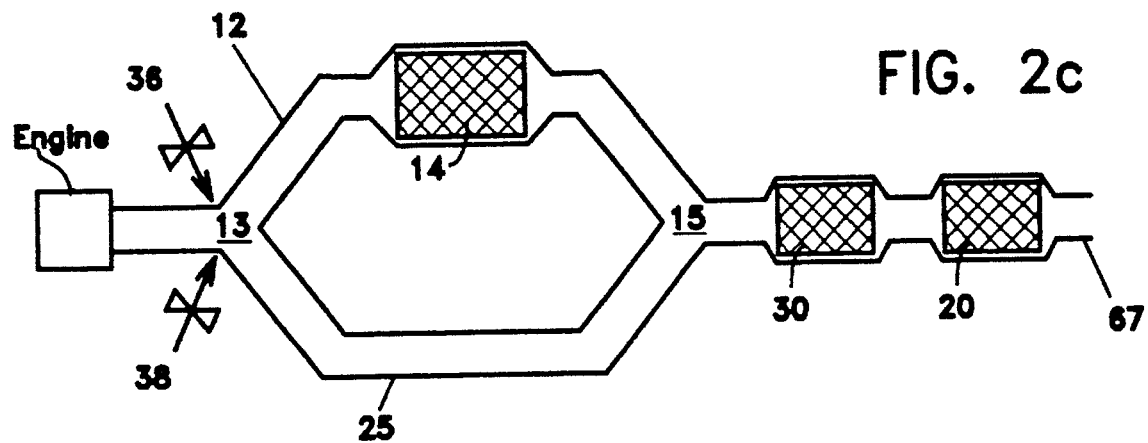

In a particularly useful embodiment FIGS. 2a–2c, an optional device such as a pre-converter, an electrically heated catalyst (EHC) such as disclosed in co-pending, co-assigned U.S. Ser. No. 08/161,126 (herein incorporated by reference), a light-off catalyst, or any combination of these, can be incorporated in the exhaust system of the invention. For example, an EHC 24 can be positioned in the system upstream from junction 13 FIG. 2a, in the exhaust pipe 25 (FIG. 2b), or ahead of the burn-off catalyst 20 but after the downstream junction 15 connecting the by-pass housing 12 and the exhaust pipe 25 (FIG. 2c). In this embodiment, using heat generated by the EHC, the burn-off catalyst 20 reaches its light-off temperature before any significant amount of hydrocarbons are desorbed from the adsorber. Also, in this embodiment, the electrically heated catalyst uses significantly less power than would be required for an EHC system without an adsorber.

In FIG. 2a, at cold-start, the exhaust stream flows through EHC 24 and at junction 13, the flow diverters 36, 38 direct substantially all of the exhaust stream away from the exhaust pipe 25, into adsorber 14 where the hydrocarbons are trapped before the exhaust stream passes to the tail pipe 67 through the burn-off catalyst 20. The EHC using auxiliary power or aided by the engine, quickly heats up bringing the exhaust stream to a sufficiently high temperature to in turn bring the burn-off catalyst 20 to its light-off temperature. At this time, flow diverters 36, 38 operate to direct substantially all the exhaust through the exhaust pipe 25 and into the burn-off catalyst. While substantially all the exhaust is flowing through the exhaust pipe 25, a small amount of exhaust is made to flow into the by-pass housing in order to bring the adsorber 14 to its desorption temperature and to desorb the trapped hydrocarbons. The EHC of FIGS. 2b and 2c operate in the same way to bring the burn-off catalyst to its effective operating temperature as quickly as possible after engine start-up. In this embodiment, the amount of hydrocarbons emitted into the atmosphere during cold-start is significantly reduced.

The flow diverters operate by injecting a small volume of a secondary gas into the exhaust gas stream through a nozzle or slot adapted to form an air wall capable of diverting the exhaust stream. The nozzles or slots are connected to a secondary air source from which a small volume of secondary air is passed into the exhaust stream at high velocity to form an air wall capable of diverting the exhaust gases away from the exhaust pipe and into the by-pass housing during cold start. This cold-start flow direction continues until the main catalytic converter 20 has attained its light-off temperature.

In one embodiment, a small volume of a secondary gas is injected at an angle into the exhaust pipe, through a rectangular slot which opens into the exhaust pipe, preferably in the region of the first junction 13 as shown in FIGS. 1 and 2. In the case of a branch exhaust system such as shown in FIG. 1, after the burn-off catalyst 20 has attained its light-off temperature, the flow diverter 26 is deactivated by turning off valve 31, causing the engine exhaust stream to flow through the exhaust pipe 25 directly from the engine (or optional light-off catalyst) to the burn-off catalyst 20, and thence out to the atmosphere through the muffler. After the burn-off catalyst 20 has attained its effective operating temperature, the hydrocarbons may then be desorbed from the adsorber. The desorbed hydrocarbons then flow to the burn-off catalyst 20 where the hydrocarbons are converted to innocuous components. To bring the adsorber 14 to its desorption temperature, it may be necessary to flow a small amount of the exhaust gases through the adsorber after light-off. Due to the angles of the by-pass housing 12 relative to the exhaust pipe 25, in this branch design some amount of the exhaust gas stream continues to flow into the by-pass housing 12 even after the diverter 26 has been deactivated. The exhaust gases passing through the adsorber 14 provide the advantageous effect of heating up the adsorber to its desorption temperature to aid in desorption of trapped hydrocarbons. However, the amount of exhaust gases flowing through the adsorber for the purpose of desorption can also be controlled by reducing the velocity of secondary air flow through the diverter 26 to a level sufficient to allow a small amount of the exhaust to continue to pass into the by-pass housing 12. For the Y-type exhaust system (FIG. 2) having two opposing flow diverters 27 and 29, this can be achieved by controlling the simultaneous flow of secondary air through both diverters. For example, instead of discontinuing flow of secondary air through the second diverter 29, secondary air flow may be continued but at a reduced velocity so that a small amount of exhaust gases continue to pass into the adsorber until desorption is completed.

Figure 3A:
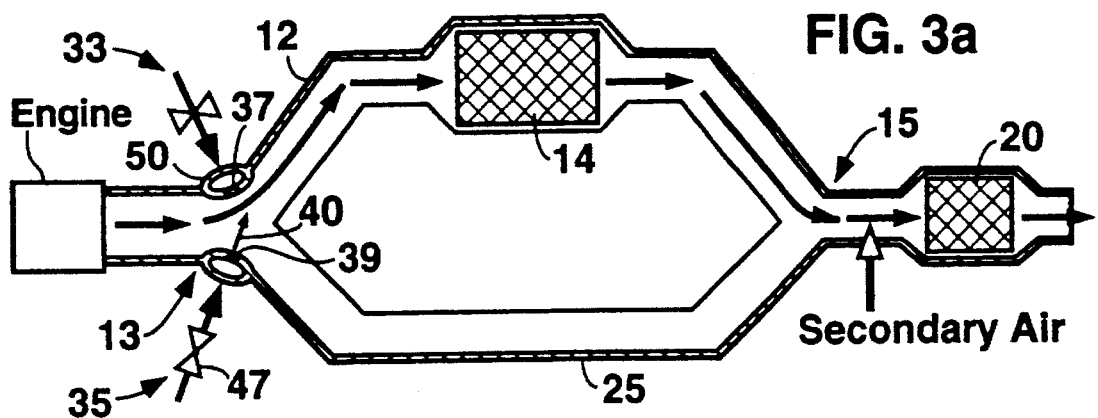
FIGS. 3a and 3b are sectional diagrams showing an embodiment of the invention in which the flow diverters include nozzles formed by two opposing semicircular slits or alternatively, a plurality of small conical nozzles formed on opposing semicircular collars formed in the region of the first junction of the exhaust system.
Figure 3B:
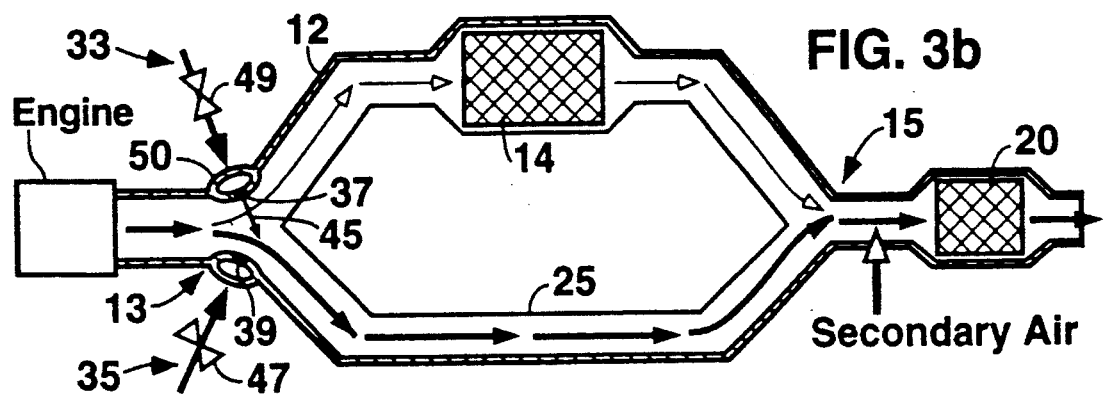

The flow diverters are further described herein with reference to FIGS. 3a and 3b. In the Y-design exhaust system, the flow diverting means preferably includes at least two flow diverters 33 and 35 positioned in the region of the first junction 13 as shown. As with the flow diverter of the branch design, each diverter is formed by connecting the nozzles or flow slots 37 and 39 to a secondary air source for forming a wall of secondary air for the purpose of forming an air wall capable of diverting exhaust gases. More preferably, the diverter is adapted to produce two opposing secondary air jets 40 and 45 in the region of the first junction 13. Air jet 40 from nozzle 39 is angled to divert the exhaust gases away from the exhaust pipe 25 and into the by-pass housing 12 during cold-start as shown in FIG. 3a. Air jet 45 from nozzle 37 is angled to divert exhaust gas flow away from the by-pass housing 12 and into the exhaust pipe 25 as shown in FIG. 3b. Thus, during cold start, secondary air jet 40 is used to direct all or substantially all of the exhaust stream through the adsorber 14. After light-off, air jet 40 is deactivated by turning off valve 47, and the second air jet 45 is activated by turning on valve 49, to direct a significant portion of the exhaust stream away from the adsorber. As stated earlier, for some period of time after light-off has been attained it may be necessary to continue to direct a small amount of the exhaust to the adsorber to aid with desorption. To aid with desorption, preferably the flow of secondary air through slot 39 can be adjusted to allow a portion of the exhaust gases to continue to pass into the by-pass housing 12 after light-off.

In the branch exhaust pipe design (FIG. 1), preferably, the flow of the secondary air is at high velocity immediately after engine start-up to direct all or substantially all of the engine exhaust gases away from the exhaust pipe and into the adsorber housing. During cold-start, secondary air flow through the diverter, though at low volume is able to achieve significant jet (strength) due to its high velocity. As the engine speed increases, and as the exhaust gas temperature begins to increase, the velocity of the secondary air jet may be gradually reduced to allow more exhaust gas to flow through the exhaust pipe to the burn-off catalyst. After the burn-off catalyst has reached its light-off temperature, flow of secondary air may be discontinued to allow free flow of the exhaust gases through the exhaust pipe.

After light-off, a portion of the exhaust gas is allowed to flow through the adsorber in order to bring the adsorber to its desorption temperature and thereby aid with desorption. Due to the geometry of the branch design, even after the flow of secondary air has been discontinued, some of the exhaust gases will continue to pass through the by-pass housing to thereby aid in the desorption of trapped hydrocarbons. For the Y-type exhaust system, it may be necessary to actively direct a portion of the exhaust gas stream to the adsorber using the flow diverters. This process will be described with reference to FIGS. 3a and 3b. Before light-off (FIG. 3a), the first diverter 35 is activated by having valve 47 in its fully open position to allow the maximum flow of secondary air into the housing to form an air wall 40. The secondary air is injected into the housing through nozzle 39 which in this case is a narrow semi-circular slit formed on the inside wall surface of one half of air injection collar 50. The air wall functions to divert the exhaust gas flow away from the exhaust pipe 25 and into the by-pass housing 12. To ensure that a portion of the exhaust gas continues to flow through the by-pass housing after light-off, instead of completely turning off valve 47 after light-off, it is left partially open when diverter 33 is activated so that a sufficient secondary air jet is produced from nozzle 39 to divert a small portion of the exhaust gases into the by-pass housing 12 as shown in FIG. 3b.

Preferably, a sufficient amount of the exhaust is directed to the adsorber to allow the adsorber to attain its desorption temperature after the main catalyst attains its light-off temperature or soon thereafter. The amount of exhaust needed to achieve desorption will vary for each system and must be determined by experimentation. Without intending to be bound by theory, it is believed that about 5 to 50 percent, preferably, 10–30 percent of the exhaust gas stream flow through the adsorber is desirable to ensure that the adsorber attains its desorption temperature when the main catalyst reaches its operating temperature. Heat conduction from the portion of the gas stream which continues to flow through the adsorber slowly heats the adsorber to its desorption temperature. The desorbed hydrocarbon is then passed to the burn-off catalyst for conversion. The respective amounts of the exhaust gas flow through the adsorber and directly to the main catalyst are appropriately proportioned so that the adsorber reaches its desorption temperature as the burn-off catalyst attains its effective operating temperature, or shortly thereafter.

After the engine has heated up, secondary air is injected into the housing as needed, preferably at the outlet end of the adsorber just before the burn-off catalyst, to restore stoichiometry, or to provide additional air necessary to convert or oxidize the desorbed hydrocarbons. Where the adsorber is catalyzed, additional air may be required at the inlet end of the adsorber for the purpose of oxidizing desorbed hydrocarbons.

Figure 4:
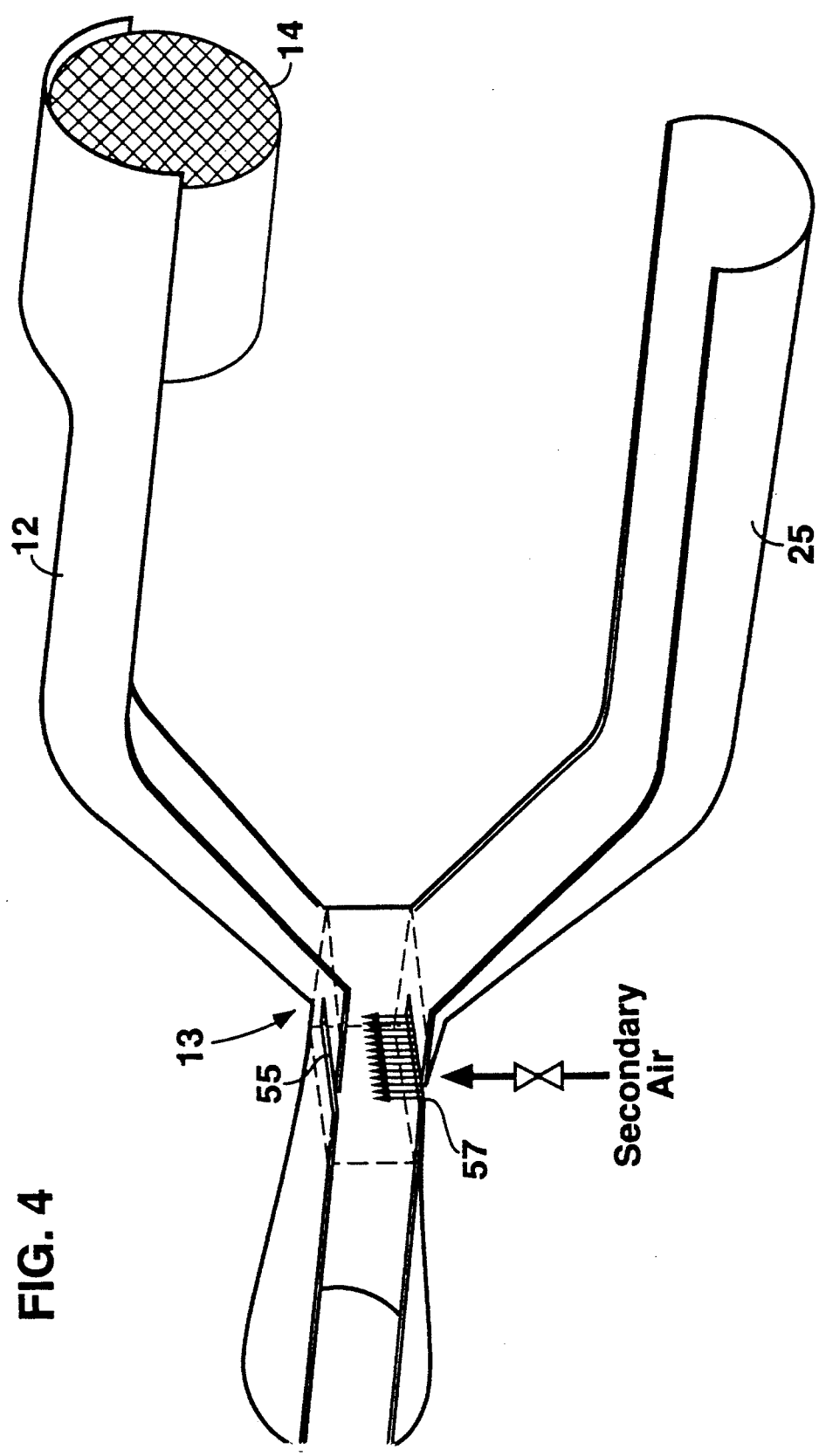
FIG. 4 is an illustrative diagram showing another embodiment of the invention where the nozzles are in the form of narrow rectangular slits formed on a rectangular junction region of the exhaust system.

The diverter can be in various forms. For example, the diverter can be a circular, tubular air injection collar 50 (FIGS. 3a and 3b) having two semi-circular sections, each section having a nozzle 37 and 39 formed by a narrow continuous slit or a series of small nozzles along the inside surfaces of the sections. In this embodiment, secondary air jets 40 and 45 project from nozzles 37 and 39 to deflect or divert the engine exhaust gas stream away from the exhaust pipe 25 and into the by-pass housing 12 or vice versa. Similarly, the nozzles may be formed in a rectangular section of the exhaust system in the region of the first junction 13 as shown in FIG. 4. In this embodiment, the exhaust system is preferably, rectangular in the region of the first junction 13 such that nozzles 55 and 57 are narrow slits formed on two opposing rectangular surfaces of the exhaust system such that when the diverters are fully activated, secondary air jets from the slits form air walls or jets across the inlet sections of the exhaust pipe and by-pass housing respectively.

Figure 5:
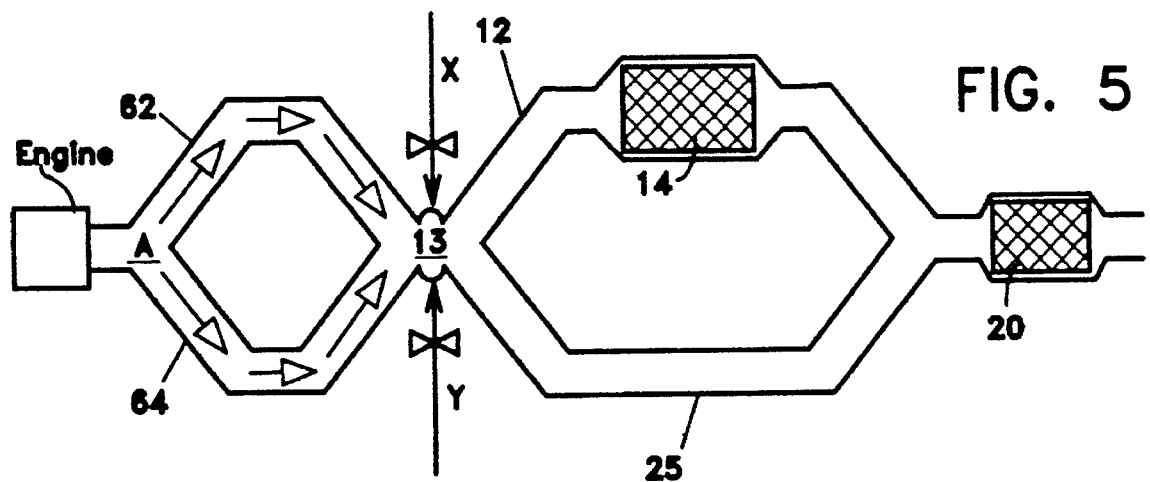
FIG. 5 is an illustrative diagram showing an embodiment of the engine exhaust system of the invention in which the exhaust stream from the engine is split into two parts before reaching the flow diverters.

In another embodiment FIG. 5, the exhaust gas stream is split at A and then recombined at junction 13 to reduce the momentum of the exhaust gas stream needed to divert the exhaust stream to either the by-pass adsorber housing 12 or to the exhaust pipe 25. In this embodiment, the volume and pressure of the air needed to divert the exhaust is significantly reduced. To minimize backpressure buildup, the dimensions of the split tubes 62 and 64, the split angle at A, and the exiting angle at junction 13 can be varied. For example, the dimensions of the split exhaust tubes 62 and 64 need not be equal. Similarly, depending on the application, the split angle, the meeting angle and the exit angles need not be symmetrical.

Figure 6:
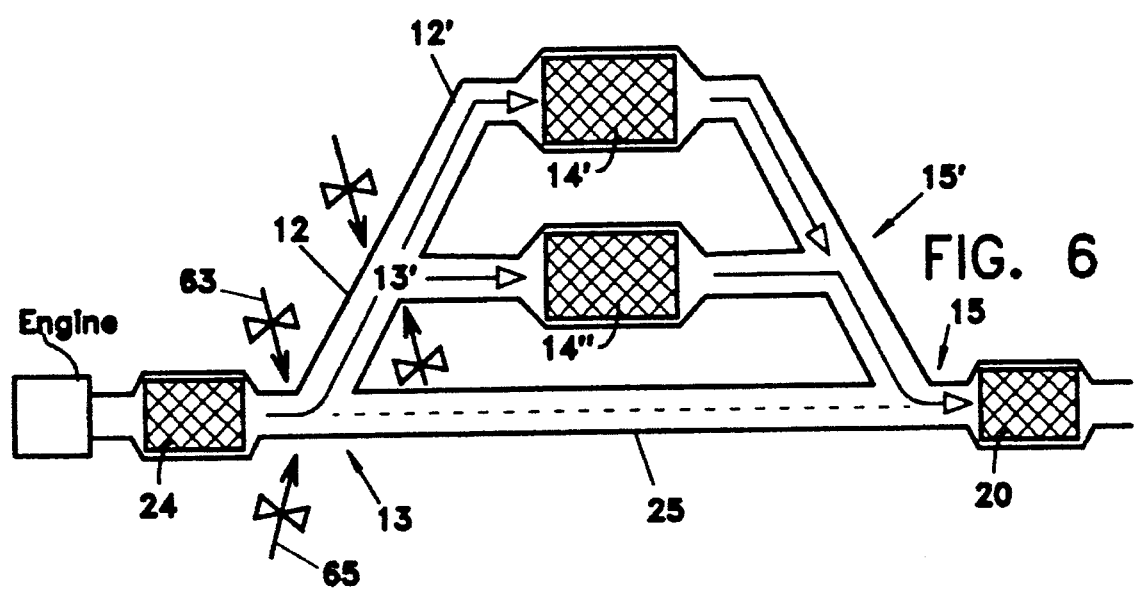
FIG. 6 is an illustrative diagram showing an embodiment of the engine exhaust system of the invention having two adsorbers, and in which the flow diverters are used to aportion exhaust stream in the by-pass housing between the several adsorbers or to sequentially direct the by-pass exhaust through the adsorbers.

In another particularly useful embodiment, the by-pass housing is modified to house more than one molecular sieve structure as shown in FIG. 6. In this embodiment, the exhaust system can be designed to include two or more by-pass housings 12, 12' each of which may contain one or more adsorbers 14', 14". During cold-start, the exhaust stream is initially diverted into by-pass housing 12. At junction 13', flow diverters 63' and 65' can be adjusted to first divert all of the exhaust stream to either adsorber 14' or 14", or to both adsorbers by aportioning the exhaust stream to the two adsorbers. Depending on the size and composition of the respective adsorbers, the amount of exhaust aportioned to each adsorber can be varied proportionately. As contemplated by this embodiment, adsorbers 14' and 14" may be made up of the same or different molecular sieve materials. For example, the two adsorbers may be directed to the adsorption of different hydrocarbon species. Thus, 14' may be a modified zeolite for adsorbing ethylene and propylene, while adsorber 14" may be a modified zeolite for adsorbing propylene and pentane or other hydrocarbons as more fully described below.

Where the exhaust stream is first directed to one adsorber, as the temperature of the adsorber is increased by the exhaust stream, and as the adsorber begins to approach its desorption temperature, flow to this first adsorber may be discontinued or substantially reduced, and directed to the second adsorber until the second adsorber reaches its desorption temperature or until the burn-off catalyst reaches its light-off temperature. As stated above, flow during cold-start can also be evenly distributed through the two adsorbers to delay attainment of desorption temperature thereby allowing sufficient time for the burn-off catalyst to reach light-off conditions.

As stated earlier, the adsorbers 14' and 14" may consist of the same or different adsorber materials depending on the hydrocarbon species to be adsorbed. For example, adsorber 14' may include modified small pore zeolites such as disclosed in co-pending, co-assigned U.S. Ser. No. 08/106,512 (herein incorporated by reference) for the purpose of adsorbing low molecular weight alkenes, in particular ethylene and propylene; while adsorber 14" may include similarly modified large pore zeolites such as disclosed in co-pending, co-assigned U.S. Ser. No. 08/221,689 (also herein incorporated by reference), for the purpose of adsorbing higher molecular weight hydrocarbons such as pentane. Alternatively, adsorbers 14' and 14" may be made up of the same adsorber material such as, for example, a molecular sieve structure composed of both types of zeolites.

Once the burn-off catalyst attains light-off conditions, the flow diverters can be adjusted as needed to direct substantially all of the exhaust away from the adsorbers and through exhaust pipe 25 to the burn-off catalyst 20. While the above illustrative example describes a two-adsorber system, it is contemplated by the invention that the exhaust system may be modified as necessary to include as many adsorbers as practical for any given application subject to space and other operating constraints.

Useful molecular sieves materials for the invention include silicates (such as the metallosilicates and titanosilicates) of varying silica-alumina ratios, metalloaluminates (such as germaniumaluminates), metallophosphates, aluminophosphates (such as silico- and metalloaluminophosphates (MeAPO), SAPO, McAPSO), gallogerminates and combinations of these. Examples of useful metallosilicates include zeolites, gallosilicates, chromosilicates, borosilicates, ferrisilicates. Examples of zeolites which are particularly useful for the invention include, ZSM-5, Beta, gmelinite, mazzite, offretire, ZSM-12, ZSM-18, Berryllophosphate-H, boggsitc, SAPO-40, SAPO-41, and combinations of these, most preferably, ZSM-5, Beta, Ultrastable Y (USY), and mordenite.

It is well known that during cold start, molecular sieve zeolites not only trap hydrocarbons but also causes cracking of some hydrocarbons (i.e., coking). To prevent coking, the adsorber may be catalyzed with suitable catalysts. As is well known in the art, noble metal oxidation catalysts such as platinum, rhodium, and palladium, may be added to zeolite molecular sieve to ensure oxidation of the carbonaceous materials which may result from coking. Any catalyst capable of converting hydrocarbons to water and carbon dioxide may be added to the zeolite. Such catalysts are well known in the art. For example, noble metal catalysts, such as platinum, rhodium, palladium, and mixtures of these are widely used in automotive catalytic converters. These catalysts are capable not only of oxidizing hydrocarbons but also of converting carbon monoxide and NOx in the engine exhaust stream to carbon dioxide and nitrogen. Such catalysts may be incorporated into the adsorber or molecular sieve structure by known methods. It is also known that certain zeolite/noble metal combinations such as disclosed in co-assigned U.S. Pat. No. 5,244,852 (herein incorporated by reference) function as three-way catalysts to convert.

As discussed above, three-way converters which additionally convert NOx and carbon monoxide to non-toxic by-products may also be used in the practice of the invention. Typically, three-way catalysts used in automotive applications comprise noble metals such as platinum and/or palladium, and rhodium. Examples of such catalysts include platinum/palladium/rhodium on gamma alumina with rare earth oxides (e.g., ceria), and platinum on ceria-alumina combined with rhodium on zirconia.

The hydrocarbon trap or molecular sieve structure of the invention, may be utilized in any number of forms. For example, the molecular sieve or zeolite may be utilized directly in the form of beads or pellet, or it may be embedded in, or coated on porous substrates. The molecular sieve material can be applied onto the substrate by any known method such as for example, by conventional washcoat or spraying techniques. In the washcoat technique, the substrate is contacted with a slurry containing the molecular sieve and other components such as temporary binders, permanent binders or precursors, dispersants and other additives as needed. Such methods are well known in the art. The permanent binder in the slurry includes for example, aluminum oxide and its precursors, silica, titania, zirconia, rare earth oxides, and their precursors, spinel and precursors. The molecular sieve slurry is then applied (for example, by repeated spraying or dipping) to the substrate until the desired amount of molecular sieve material has been applied. One useful method for forming zeolite on the surface of a substrate is disclosed in U.S. Pat. No. 3,730,910, herein incorporated by reference.

In one particularly useful embodiment, the molecular sieve is zeolite in the form of a porous monolithic structure formed by extruding the zeolite into a honeycomb structure. U.S. Pat. No. 4,381,255, herein incorporated by reference, discloses a process for producing binderless zeolite extrudates by extruding a mixture containing equal amounts of a zeolite powder, a metakaolin clay and a near stoichiometric caustic solution, in which the clay in the extrudate crystallizes to form a coherent particle that is essentially all zeolite. Similarly, U.S. Pat. 4,637,995, herein incorporated by reference, discloses a method for preparing a monolithic zeolite support comprising a ceramic matrix having zeolite dispersed therein.

Another useful method of forming the molecular sieve structure includes embedding or coating zeolite on a metal, metal alloy, ceramic, or glass ceramic substrate, such as extruded honeycomb substrates, as disclosed in U.S. Pat. No. 4,657,880 herein incorporated by reference.

The adsorber can also be formed by in situ growth of zeolite, that is, by crystallizing zeolite on the surface of a metal, metal alloy, ceramic, or glass ceramic substrate. A method for crystallizing strong-bound zeolites on the surfaces of monolithic ceramic substrates is disclosed in U.S. Pat. No. 4,800,187, herein incorporated by reference.

The substrate can be any material suitable for high temperature application such as certain metals, metal alloys, ceramics, glass-ceramics, glass, high surface area-high temperature stable oxides, and combinations of these materials. Examples of useful substrate materials include, cordierite, mullite, clay, talc, zircon, zirconia, spinel, alumina, silica, borides, lithium aluminosilicates, alumina silica, feldspar, titania, fused silica, nitrides, carbides and mixtures of these. Useful metals for the substrate include, substrates formed of iron group metals such as Fe-Al, Fe-Cr-Al alloys, stainless steel, and Fe-Nickel alloys.

U.S. Pat. No. 4,631,267, herein incorporated by reference, discloses a method for producing a monolithic support structure for zeolite by (a) mixing into a substantially homogeneous body (i) a zeolite, (ii) a precursor of a permanent binder for the zeolite selected from the group consisting of alumina precursors, silica precursors, titania precursors, zirconia precursors and mixtures of these, and (iii) a temporary binder; and extruding the mixture to form a porous monolithic molecular sieve structure.

In addition to the embodiments discussed above, it will be clear to persons skilled in the art that numerous modifications and changes can be made to the above invention without departing from its intended spirit and scope.

We claim:

1. An engine exhaust system for a hydrocarbon-containing engine exhaust stream comprising:

a housing having disposed therein at least two molecular sieve structures connected in parallel each having a desorption temperature, the molecular sieve structures and the housing both having an inlet and an outlet end;

a burn-off catalyst having a light-off temperature, disposed downstream from the molecular sieve structure;

an exhaust pipe connecting an engine to the burn-off catalyst, the exhaust pipe being connected to the inlet end of the housing at an upstream junction and to the outlet end of the housing at a downstream junction; and a flow diverter disposed in the upstream junction for diverting exhaust gases from the engine to the housing and an additional flow diverter for directing exhaust stream between the two molecular sieve structures.

2. The exhaust system of claim 1, further comprising a main catalytic converter disposed downstream from the adsorber housing.

3. The exhaust system of claim 2, wherein the main catalytic converter is a three-way catalyst having a light-off temperature, for converting carbon monoxide, hydrocarbon, and NOx to carbon dioxide, water and nitrogen.

4. The exhaust system of claim 1, wherein the molecular sieve structure comprises zeolites supported on a substrate.

5. The exhaust system of claim 4, wherein the substrate is a honeycomb structure.

6. The exhaust system of claim 1, wherein the adsorber further comprises a catalyst.

7. The exhaust system of claim 1, wherein the molecular sieve structure is a monolithic honeycomb structure.

8. The exhaust system of claim 1, wherein the molecular sieve structure is a zeolite selected from ZSM-5, Beta, ultra-stable Y, mordenite, and combinations of these.

9. The exhaust system of claim 1, further comprising an electrically heated catalyst or pre-converter disposed in a location selected from the group consisting of (1) upstream from the junction, (2) in the exhaust pipe, and (3) between the burn-off catalyst and a second junction connecting the outlet end of the housing to the exhaust pipe.

10. The exhaust system of claim 1, wherein the molecular sieve structure comprises an extruded honeycomb structure having a frontal area, and having a plurality of cells running longitudinally parallel between the inlet and the outlet ends of the structure.

11. The exhaust system of claim 10, wherein the flow diverters are connected to a secondary air source.

12. The exhaust system of claim 1, wherein the molecular sieve structure comprises extruded zeolites selected from the group consisting of ZSM-5, USY, Mordenite, Beta zeolites and combinations of these.

13. The exhaust system of claim 1, wherein the molecular sieve structure comprises zeolites supported on a substrate.

14. The exhaust system of claim 13, wherein the substrate is in a form selected from the group consisting of pellets and cellular monoliths.

15. The exhaust system of claim 14, wherein the substrate is an extruded cordierite structure.

16. The exhaust system of claim 1, wherein the molecular sieve structure further comprises a catalyst.

17. The exhaust system of claim 1, wherein the burn-off catalyst is selected from the group consisting of segmented catalyst, multistage catalyst, three-way catalyst, and combinations of these.

18. The exhaust system of claim 12, further comprising a main catalytic converter disposed between the engine and the upstream junction.

19. The exhaust system of claim 18, wherein the main catalytic converter comprises a three-way catalyst.

20. Method of treating a hydrocarbon-containing engine exhaust stream by (1) providing the exhaust system of claim 1 having two molecular sieve structures;

(2) during cold-start, first flowing the exhaust stream from the engine through a first molecular sieve structure until the first molecular sieve structure approaches its desorption temperature, and then flowing the exhaust stream through a second molecular sieve structure until the second molecular sieve structure approaches its desorption temperature;

(3) after light-off, directing a substantial amount of the exhaust gases through the exhaust pipe while continuing to flow a small portion of the exhaust through the adsorbers to bring the molecular sieve structures to the desorption temperatures to thereby desorb hydrocarbons therefrom; and (4) during desorption, contacting the molecular sieve structure with additional air from a secondary air source to effect oxidation of the desorbed hydrocarbons and to cool the molecular sieve structure.

21. Method of treating a hydrocarbon-containing engine exhaust stream by (1) providing the exhaust system of claim 1;

(2) during cold-start, apportioning the exhaust stream from the engine through the at least two molecular sieve structures until the molecular sieve structures approach desorption temperatures;

(3) after light-off, directing a substantial amount of the exhaust stream through the exhaust pipe while continuing to flow a small portion of the exhaust through the adsorbers to bring the molecular sieve structures to the desorption temperatures to thereby desorb hydrocarbons therefrom; and (4) during desorption, contacting the molecular sieve structure with additional air from a secondary air source to effect oxidation of the desorbed hydrocarbons and to cool the molecular sieve structure.

22. The exhaust system of claim 1 wherein the flow diverter is adapted to adapted to direct a substantial portion of the exhaust stream through the burn-off catalyst and a minor portion of the exhaust through the molecular sieve structure, after the burn-off catalyst has attained its light-off temperature.

* * * * *